W. Wright,
Steam-Engine Valve-Gear.
N°59,887. Patented Nov. 20, 1866.

Witnesses
Inventor

United States Patent Office.

IMPROVEMENT IN VARIABLE CUT-OFF VALVE GEAR.

WILLIAM WRIGHT. OF NEW YORK.

Letters Patent No. 59,887, dated November 20, 1866.

SPECIFICATION.

TO ALL WHOM IT MAY CONCERN:

Be it known that I, WILLIAM WRIGHT, of the city, county, and State of New York, have invented a certain new and useful improvement in Variable Valve Gear of steam and other engines; and I do hereby declare that the following is a full, clear, and exact description of the same, reference being had to the accompanying drawing, which forms part of this specification, and in which—

Figure 1:
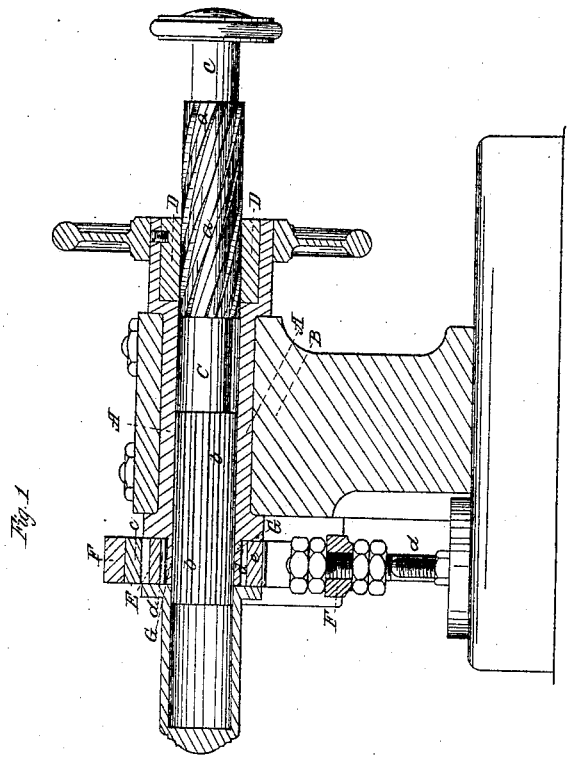
Figure 2:
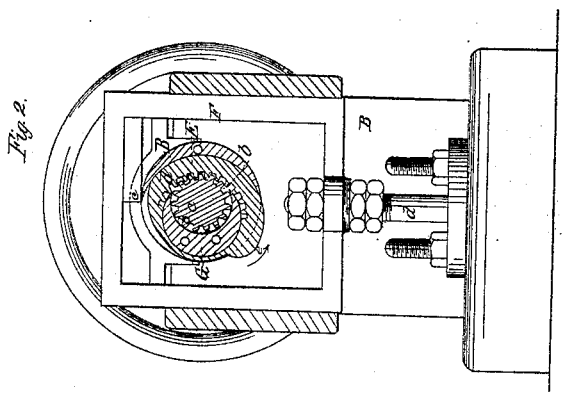

Figure 1 represents a vertical longitudinal section of my improved variable valve gear as applied to a single valve; and Figure 2, a transverse view of the same, partly in elevation and partly in section.

Similar letters of reference indicate corresponding parts in each of the figures.

The object of my invention is to raise and lower the cut-off valves of steam and other engines by an easy cam action adjustable by hand, at pleasure, or by the governor of the engine, as may be, so as to regulate the range or action of the valves by causing them to close at any desired point in the engine stroke; and my improvement consists in a novel combination of a revolving toothed cam or lifter, eccentric cam or hub, and revolving toothed spindle, which is also provided with spiral grooves or threads for giving the necessary action by a longitudinally sliding movement of the spindle to the toothed cam or lifter, to determine the period of closing and range or action of the valve, without, however, or of necessity, altering the point or period at which the valve commences to open.

Prior to more minutely describing my improvement, I would remark that it is not only applicable to puppet but also to sliding or other valves, and though here shown as working only one valve, is or may be used in duplicate for operating two or more valves, and, as before observed, may either be worked by hand or by the engine governor.

In the accompanying drawing the portion marked A represents the valve shaft working in a suitable frame or bearing, B, and made to revolve by any appropriate means. This shaft is made hollow, to receive within it a longitudinally sliding spindle, C, that also revolves with the shaft A, but which may be turned in opposite directions independently of it by means of spiral ribs or threads, $a$, cut on or in the spindle, and made to fit into or gear with a correspondingly threaded nut, D, fast to the valve shaft. This spindle, C, is also provided or made with a long cogged or toothed portion, $b$, for operating the cam or revolving lifter E, which regulates the rise of the valve by its action on or under a toe-piece, $c$, of a sliding yoke, F, that carries the valve stem $d$. Fast to the valve shaft is an eccentric or cam projection, G, receiving within or through it the toothed portion, $b$, of the spindle C, and the outer periphery or surface of which is eccentric to the spindle C and valve shaft A. Fast also to the valve shaft is a part-hub, H, the inner surface of which may serve as a seat or bearing in part to the toothed cam or revolving lifter E, while the outer surface or periphery of the same may be made concentric to the valve shaft, and serve, either separately or in conjunction with a portion or portions of the periphery of the lifter E, to receive upon it in a state of rest the toe-piece, $c$, of the yoke F, so as to relieve the valve of undue pressure, or the valve may be otherwise relieved when closed. The lifter E lies within the part-hub H, and in the course of adjustment turns, as it were, within the same. Internally it is made to fit so as to turn upon the eccentric G, and is provided with teeth, $d$, which gear with the toothed portion, $b$, of the spindle C. Externally the lifter is formed with a toe, $e$, which, as the valve shaft, longitudinally sliding spindle, and lifter, all revolve together, gives more or less lift to the valve accordingly as said toe is projected more or less out of the part-hub H, and, of course, by the action of the eccentric G, more or less distant from the centre of the valve shaft, such action being regulated by sliding in or out the internal spindle C, which, by means of its spiral grooves or threads acting in the nut D of the valve shaft, gives an independent turn in either direction by the toothed portion, $b$, of the spindle to the lifter. In this way, without, however, or of necessity, changing the period at which the valve commences to lift, is the range or action of it and period for closing the same determined.

What I claim as my invention, and desire to secure by Letters Patent, is—

The combination of the revolving toothed lifter E, eccentric G fast to the valve shaft, and toothed and spirally grooved, or ribbed, longitudinally sliding spindle C, arranged for operation together, and with the hollow valve shaft, substantially as shown and described.

W. WRIGHT.

Witnesses:
A. LE CLERC,
J. W. COOMBS.